United States Patent [19]

Yoshihara et al.

[11] Patent Number: 5,248,981
[45] Date of Patent: Sep. 28, 1993

[54] APPARATUS AND METHOD FOR POSITIONING OF A GPS RECEIVER

[75] Inventors: Tooru Yoshihara; Masashi Shimakata; Toshiaki Tsuchiya; Shigeru Tsujimura, all of Saitama, Japan

[73] Assignee: Pioneer Electronic Corporation, Tokyo, Japan

[21] Appl. No.: 657,784

[22] Filed: Feb. 20, 1991

[30] Foreign Application Priority Data

May 10, 1990 [JP] Japan .................................. 2-118696
May 22, 1990 [JP] Japan .................................. 2-130259

[51] Int. Cl.$^5$ .......................... H04B 7/185; G01S 5/02
[52] U.S. Cl. ...................................... 342/357; 342/374
[58] Field of Search .................... 342/357, 457, 374

[56] References Cited

U.S. PATENT DOCUMENTS

| | | |
|---|---|---|
| 3,670,275 | 6/1972 | Kalliomaki et al. |
| 4,626,858 | 12/1986 | Copeland ............................ 342/374 |
| 4,647,935 | 3/1987 | Helbling ............................ 342/357 |
| 4,719,469 | 1/1988 | Beier et al. ........................ 342/357 |
| 4,949,268 | 8/1990 | Nishikawa et al. ................. 342/457 |

FOREIGN PATENT DOCUMENTS 4002176 8/1990 Fed. Rep. of Germany.

OTHER PUBLICATIONS

"Applicability of an Augmented GPS for Navigation in the National Airspace System," Schuchman et al. 8078 Proceedings of the IEEEE, 77 (1989) Nov., No. 11.
European Search Report.
Jeff Hurn, "GPS-A Guide to the Next Utility", 1989.
Article from "Fishing Boat" Magazine, No. 273, Feb. 1988, Fishing Boat Association.

Primary Examiner—Theodore M. Blum
Attorney, Agent, or Firm—Sughrue, Mion, Zinn, Macpeak & Seas

[57] ABSTRACT

A GPS receiver and related method for positioning on the Globe. The GPS receiver receives satellite signals in a sequential manner with a plurality of antennas, whereby any of the plurality of antennas which receives satellite signals from the maximum number of GPS satellites is selected by an antenna switching unit under the control of a control unit, a combination of GPS satellites having the smallest PDOP value or the signal strength in due order is selected by the control unit from among all of GPS satellites in contact with respective antennas when each of the antennas fails to receive satellite signals transmitted by the predetermined minimum number of GPS satellites. The related positioning method is for use with a motor vehicle-mounted GPS receiver having a plurality of receiving channels, wherein each receiving channel independently receives satellite signals from the GPS satellites in contact, a required number of GPS satellites which are currently considered to be the most suitable for positioning in view of PDOP value are selected from among all of GPS satellites in contact through each receiving channel, and thereby a GPS satellite other than the selected ones may be substituted for the obstructed GPS satellite for carrying out the positioning by making use of navigation data of the newly selected GPS satellite without any intermission.

14 Claims, 4 Drawing Sheets

APPARATUS AND METHOD FOR POSITIONING OF A GPS RECEIVER

BACKGROUND OF THE INVENTION

1. Field of the Invention

This invention relates to a method and apparatus for positioning and, more particularly, to a method and GPS (Global Positioning System) receiver for positioning on the Globe by making use of satellite signals transmitted from a plurality of artificial satellites.

2. Description of the Prior Art

One of the positioning systems currently in service utilizing artificial satellites is known as a so-called Global Positioning System (GPS). In accordance with this positioning system, the entire surface of the Earth is covered by a total of 24 GPS satellites when all of them are launched in six orbits at approximately 20,200 km above the Earth with four GPS satellite each. Each GPS satellite transmits a satellite signal containing navigational data through a spread-spectrum transmission system. Positioning may be performed on the ground, on the sea or in the air by receiving satellite signals from a plurality of GPS satellites, for example, by receiving the satellite signals from three GPS satellites for two-dimensional positioning and from four GPS satellites for three-dimensional positioning. Based on the navigational data contained in the satellite signal from each GPS satellite, positional information of the receiving point such as a latitude, longitude and altitude can be determined in real time.

This Global Positioning System was originally developed for U.S. military use, however, a part of the satellite or GPS signal (C/A code) has been made available for civil use. Therefore, it becomes possible to provide a navigation system for use in motor vehicles, water vessels and aircraft by making use of the satellite signals.

Since the satellite signals are transmitted by the spread-spectrum transmission system, the reception of the satellite signal must be initiated by locking a phase-locked loop (PLL) circuit of the GPS receiver exactly on a receiving frequency of the satellite signal. Upon successful locking of the PLL circuit, the received spread-spectrum signal is despread and demodulated to receive navigation data.

One of the typical motor vehicle-mounted navigation apparatus of the prior art for use in the GPS system is a single-channel type GPS receiver having a single antenna, single RF receiving unit and single signal processing unit. Accordingly, it has been necessary to receive satellite signals from the minimum number of GPS satellites in a sequential manner through the single receiving channel for positioning.

Another type of known motor vehicle-mounted GPS receiver is a multi-channel GPS receiver having a plurality of receiving channels each of which is assigned for receiving a satellite signal from an allotted GPS satellite.

In the prior art system, in case of receiving satellite signals transmitted by a plurality of GPS satellites with a single antenna, obstructions such as a building and the like have prevented the GPS receiver from receiving the satellite signals transmitted by the predetermined minimum number of GPS satellites which are needed for positioning. This problem is particularly encountered with the motor vehicle-mounted GPS receiver which moves together with the motor vehicle.

As described, in the typical multi-channel type motor vehicle-mounted GPS receiver of the prior art, the required number of GPS satellites for positioning has been shared with multiple receiving channels for receiving satellite signals transmitted therefrom. However, one of the disadvantages of this prior art system is that, if any of the GPS satellites, a satellite signal from which has been received by one of the receiving channels of the GPS receiver, is obstructed by a building or other obstacles, it will become impossible to receive the required satellite signals from the minimum number of GPS satellites for positioning. This results in an interruption of the positioning by the GPS receiver.

It is therefore an object of the present invention to provide a GPS receiver which is capable of maintaining as good receiving condition as possible even if any GPS satellite in use is obstructed by an obstacle in the midst of positioning.

It is another object of the present invention to provide a positioning method for use with a motor vehicle-mounted GPS receiver, wherein the GPS receiver is maintained at high degree of accuracy of positioning even if any GPS satellite in use is obstructed by an obstacle and resulting in no reception of satellite signal therefrom in the midst of positioning.

SUMMARY OF THE INVENTION

In order to achieve the foregoing and other objects of the present invention, as a first aspect of the invention, there is provided a single-channel type GPS receiver having a plurality of antennas, an antenna switching device for selecting any of the plurality of antennas, and a controller for controlling the antenna switching device to select any of the plurality of antennas which receives satellite signals from the maximum number of GPS satellites.

In accordance with the first aspect of the present invention, it is possible to select the best antenna for receiving satellite signals from among the plurality of antennas and to utilize the selected antenna for positioning. Thus the satellite signals from the maximum number of GPS satellites can be received in any case even if any of the GPS satellites is obstructed by a building or the like to maintain the positioning operation by making use of the rest of GPS satellites in contact.

In accordance with a second aspect of the present invention, there is provided a single channel type GPS receiver having a plurality of antennas, an antenna switching device for selecting any of the plurality of antennas, and a control device for selecting a predetermined number of GPS satellites being suited for positioning from among all of GPS satellites in contact with respective antennas when each of the antennas fails to receive satellite signals transmitted by the predetermined minimum number of GPS satellites, and further, controlling the antenna switching device for sequentially selecting the antennas which correspond to the selected GPS satellites.

Further, according to the second aspect of the invention, if the total number of GPS satellites in contact with the all antennas becomes less than the predetermined minimum number of GPS satellites, the minimum number of GPS satellites required for positioning are selected from among all of GPS satellites the satellite signals of which are received by respective antennas. Therefore, even if the positioning becomes impossible with the satellite signals received by each individual antenna, it is possible to carried out the positioning by utilizing the GPS satellites in contact with the all antennas. The required number of GPS satellites may be determined in such a manner as by selecting a combination of the GPS satellites having the smallest PDOP (Position Dilution of Precision) value or by selecting the GPS satellites in order of signal strength of the received satellite signals.

In accordance with a third aspect of the present invention, there is provided a positioning method for use with a multi-channel type motorl vehicle-mounted GPS receiver having a plurality of receiving channels each of which includes an antenna, an RF receiving unit and a signal processing unit independently. According to this positioning method, each receiving channel independently receives satellite signals transmitted from the GPS satellites in contact, a predetermined number of GPS satellites which are currently considered to be the most suitable for positioning are selected from among all of GPS satellites whose signals are being received by each receiving channel, and the positioning is performed by making use of navigation data obtained from the selected GPS satellites.

That is, according to the third aspect of the invention, since the predetermined number of satellites which are currently considered to be the most suitable for positioning are selected from among all of GPS satellites whose transmitted signals are received by all receiving channels and navigation data contained in the transmitted signals are used to carry out the positioning operation, even if any GPS satellite is obstructed by a building or other obstacles in the midst of positioning, a GPS satellite other than the selected ones may be substituted for the obstructed GPS satellite, and then the positioning can be carried out by making use of navigation data of the newly selected GPS satellite without any intermission. The selection of the GPS satellites which are considered to be the most suitable for positioning at a given point of time may be performed in view of the PDOP value. That is, the selection may easily be done by only selecting a combination of the GPS satellites which has the smallest PDOP value.

DESCRIPTION OF THE PREFERRED EMBODIMENTS

Preferred embodiments of the present invention will now be described with reference to the accompanying drawings.

Figure 1:
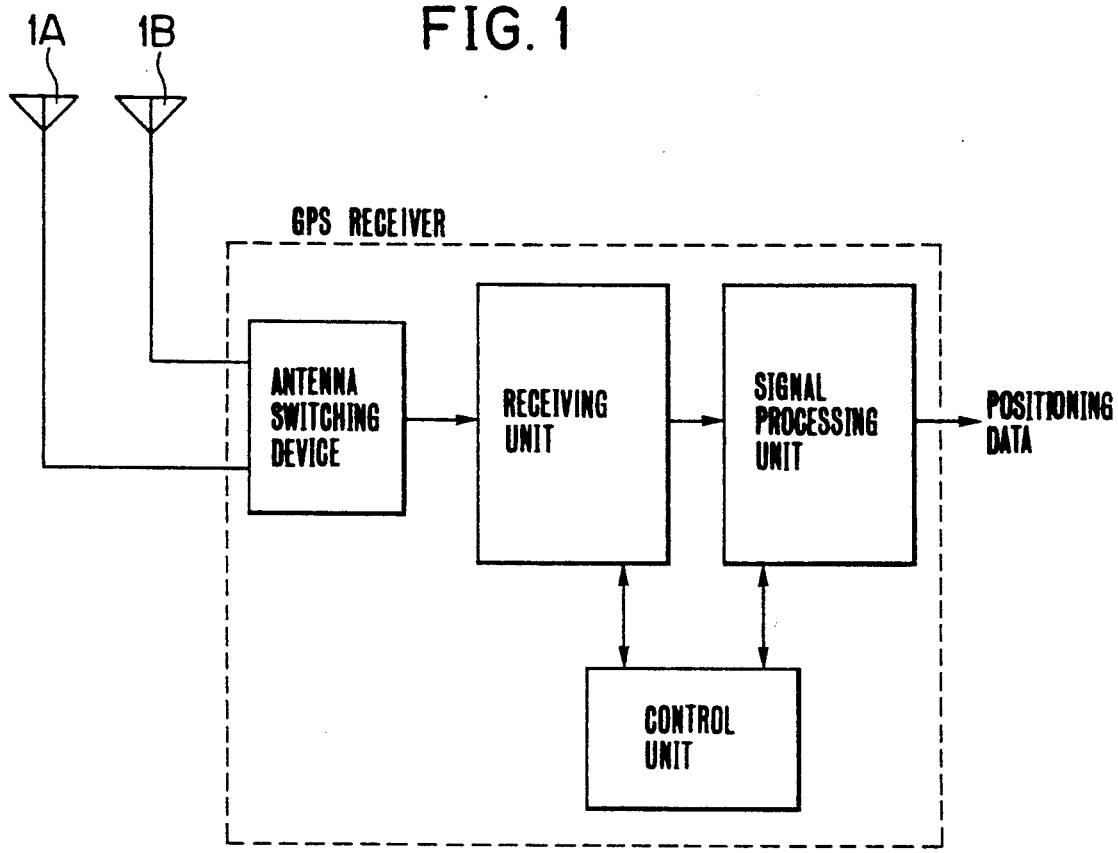
FIG. 1 is a block diagram showing a motor vehicle-mounted GPS receiver embodying the present invention.
Figure 2:
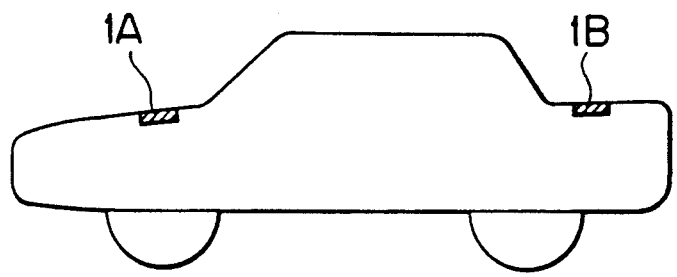
FIG. 2 is a diagram showing antennas to be used in the embodiment of FIG. 1.

FIG. 1 is a block diagram showing a first embodiment of this invention taking the form of a motor vehicle-mounted GPS receiver. In FIG. 1, elements 1A and 2B denote two antennas mounted independently of each other, a block 2 denotes an antenna switching unit for selecting any of the two antennas as needed, a block 3 denotes an RF receiving unit for receiving satellite signals sequentially from target GPS satellites by despreading the received satellite signals, a block 4 denotes a signal processing unit for reckoning the current position based on the navigation data contained in the received satellite signals of the GPS satellites, and a block 5 denotes a control unit for controlling the above components. As shown in FIG. 2, the two antennas 1A and 1B should preferably be mounted apart from each other to the full extent as possible, for example, at the front side and the rear side of the motor vehicle.

Figure 3:
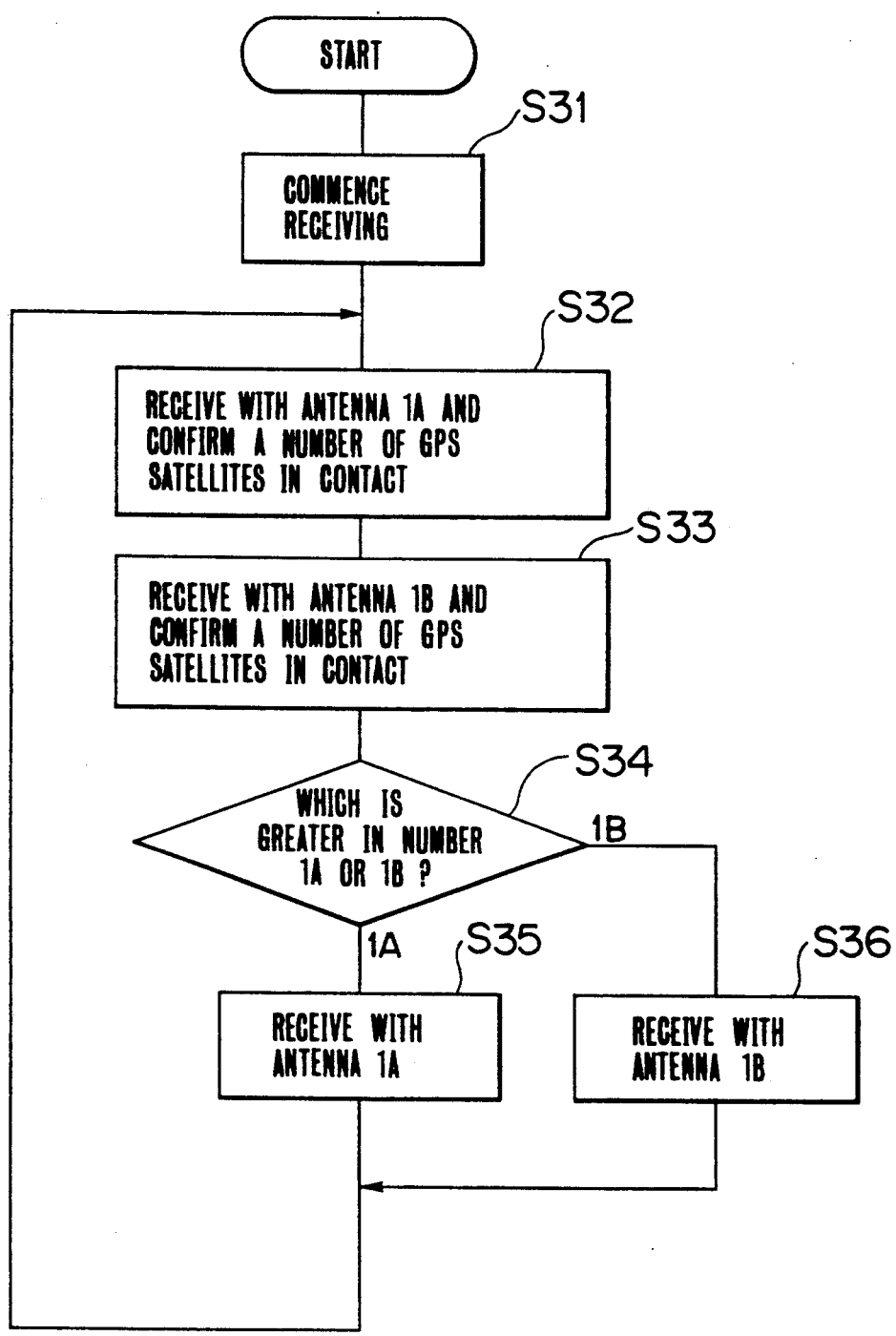
FIG. 3 is a flowchart showing operational steps performed by the embodiment of FIG. 1.

The first embodiment of the invention will now be described with reference to a flowchart of FIG. 3. Upon initiation of the apparatus, the GPS receiver performs a first step S31 of receiving a satellite signal transmitted by the GPS satellite in contact. At steps S32 and S33, the controller 5 controls the antenna switching unit 2 to alternately select the antennas 1A and 1B, sends satellite signals received by respective antennas to the RF receiving unit 3 and signal processing unit 4 and then decides a number of GPS satellites for each of the antennas 1A and 1B. At step S34, the controller 5 compares the number of GPS satellites in contact with the antennas 1A and 1B for deciding which antenna excels in number of contacts with the GPS satellites.

If the antenna 1A is decided at step S35 to be greater in the number of contacted GPS satellites than that of the antenna 1B, the controller 5 switches the antenna switching unit 2 to select the antenna 1A in order to receive the satellite signals through the antenna 1A. While, if the antenna 1B is found to be greater in the number of contacted GPS satellites, the controller 5 switches the antenna switching unit 2 to select the antenna 1B in order to receive the satellite signals through the antenna 1B at step S36.

The controller 5 repeats the aforesaid operational steps at predetermined intervals. Consequently, either of the antennas 1A and 1B which can receive satellite signals from greater number of GPS satellites is used for receiving the transmissions from the GPS satellites. If any of the GPS satellites in contact is obstructed by an obstacle such as a building, it is still possible to continue the positioning by utilizing the rest of GPS satellites which are still in contact.

Figure 4:
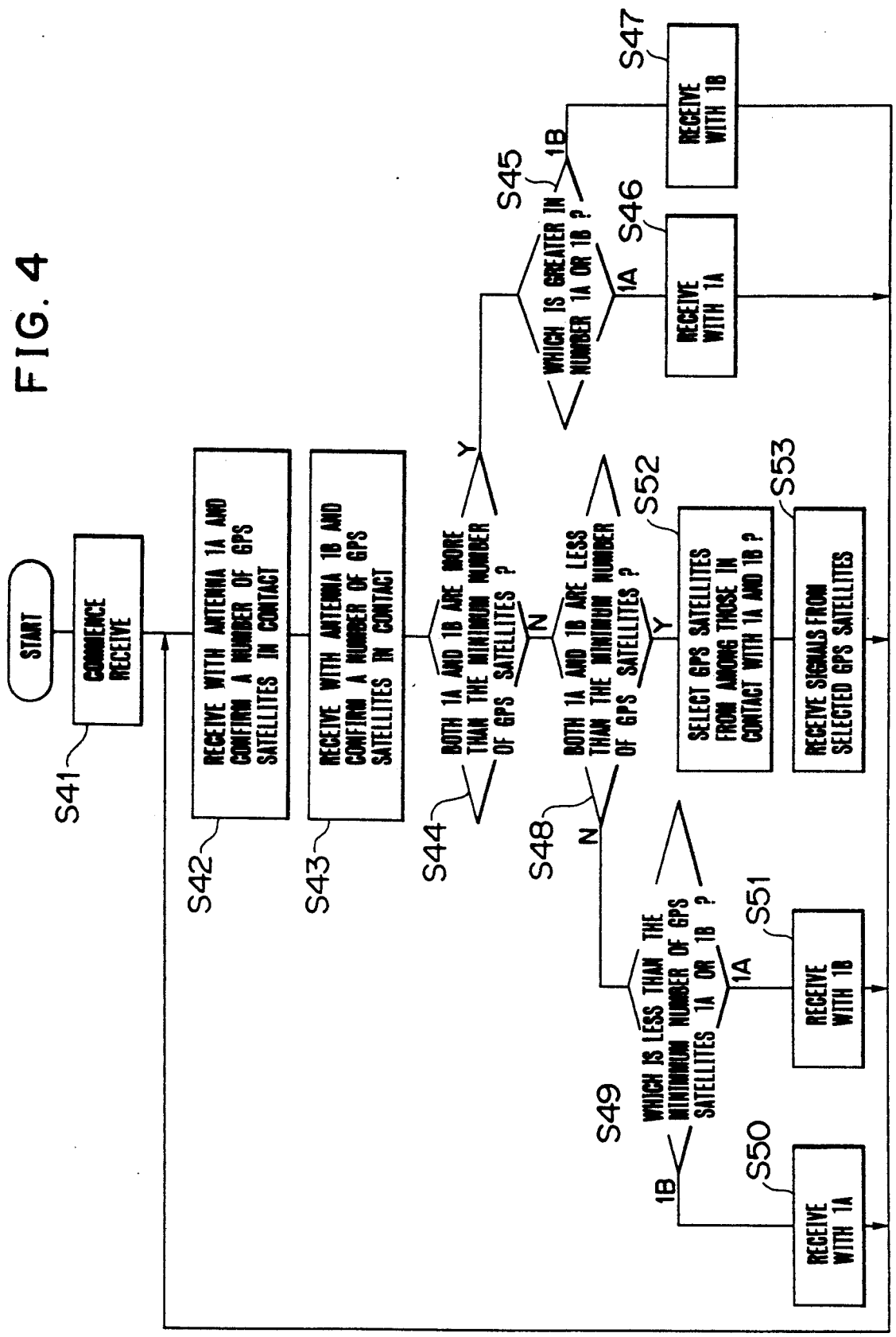
FIG. 4 is a flowchart showing operational steps performed by another embodiment of this invention.

FIG. 4 is a flowchart showing operational steps to be performed by a second embodiment of the invention. The second embodiment of this invention has the same construction as that of the first embodiment. In accordance with the second embodiment of this invention, the minimum number of GPS satellites which is considered to be a threshold value for positioning, for example, five GPS satellites, are assigned preliminarily for each of the two antennas 1A and 1B and are utilized in decision steps following the step S44 in the flowchart of FIG. 4.

Upon initiation of the GPS receiver, the GPS receiver perform a first step S41 of receiving satellite signals from GPS satellites in contact. At steps S42 and S43, the control unit 5 controls the antenna switching unit 2 for finding the number of GPS satellites that can be readable with respective antennas by selecting the antennas 1A and 1B alternately and supplying received satellite signals to the RF receiving unit 3 and signal processing unit 4. The control unit 5 determines at step S44 whether or not the number of GPS satellites in contact with each of the antennas 1A and 1B exceeds the minimum number of GPS satellites preliminarily determined therefor.

If the number of GPS satellites in contact exceeds the predetermined minimum number of GPS satellites either with the antenna 1A or antenna 1B, the program goes to step S45 for deciding which antenna has greater number of GPS satellites in contact than the other. The reception of satellite signals is then performed either at step S46 or S47 by utilizing the antenna having the greater number of GPS satellites in contact.

If it is found at step S44 that the number of GPS satellites in contact with the both antennas 1A and 1B does not exceed the predetermined minimum number of GPS satellites, the program then goes to step S48 and it is determined whether or not the number of GPS satellites in contact with both antennas 1A and 1B are less than the predetermined minimum number of GPS satellites. IF it not, the program goes to step S49 for determining which antenna has less than the predetermined minimum number of GPS satellites in contact. The reception of satellite signals is then performed either at step S50 or S51 by utilizing the antenna which is not less than the predetermined minimum number of GPS satellites in contact. However, if it is, the program goes to S52 and the minimum required number of GPS satellites for positioning at that point of time are selected from among all of GPS satellites in contact with the both antennas 1A and 1B.

As described, one of the typical selecting conditions for GPS satellites at step S52 is to select a combination of the required number of GPS satellites having the smallest PDOP value and that another condition is to select the required number of GPS satellites in order of signal strength of the received satellite signals.

Upon selecting the required number of satellites at step S52, the controller 5 adaptively controls the antenna switching unit 2 for sequentially receiving satellite signals from the selected plurality of GPS satellites by utilizing the both antennas 1A and 1B.

The controller 5 repeats the above described operational steps at predetermined intervals. Consequently, if both of the two antennas 1A and 1B become a state of being in contact with less than the predetermined minimum number of GPS satellites, the required minimum number of GPS satellites suited for positioning are selected from among all of GPS satellites in contact with the both antennas 1A and 1B. Accordingly, if any GPS satellite whose transmissions are being received is obstructed by a building or the like, it is possible to perform the positioning by making use of another GPS satellite in contact without interrupting the positioning operation.

Two antennas are employed in the foregoing preferred embodiments of the invention, however, it is apparent for those skilled in the art that more than two antennas may be employed to receive transmissions from the GPS satellites. Further, the minimum number of GPS satellites to be used at the decision steps in the second embodiment may be determined independently for each of the antennas in use or may be determined to be the same for all antennas. It depends on a system specification to be employed for positioning whichever the minimum number of GPS satellites is determined for all antenna.

Figure 5:
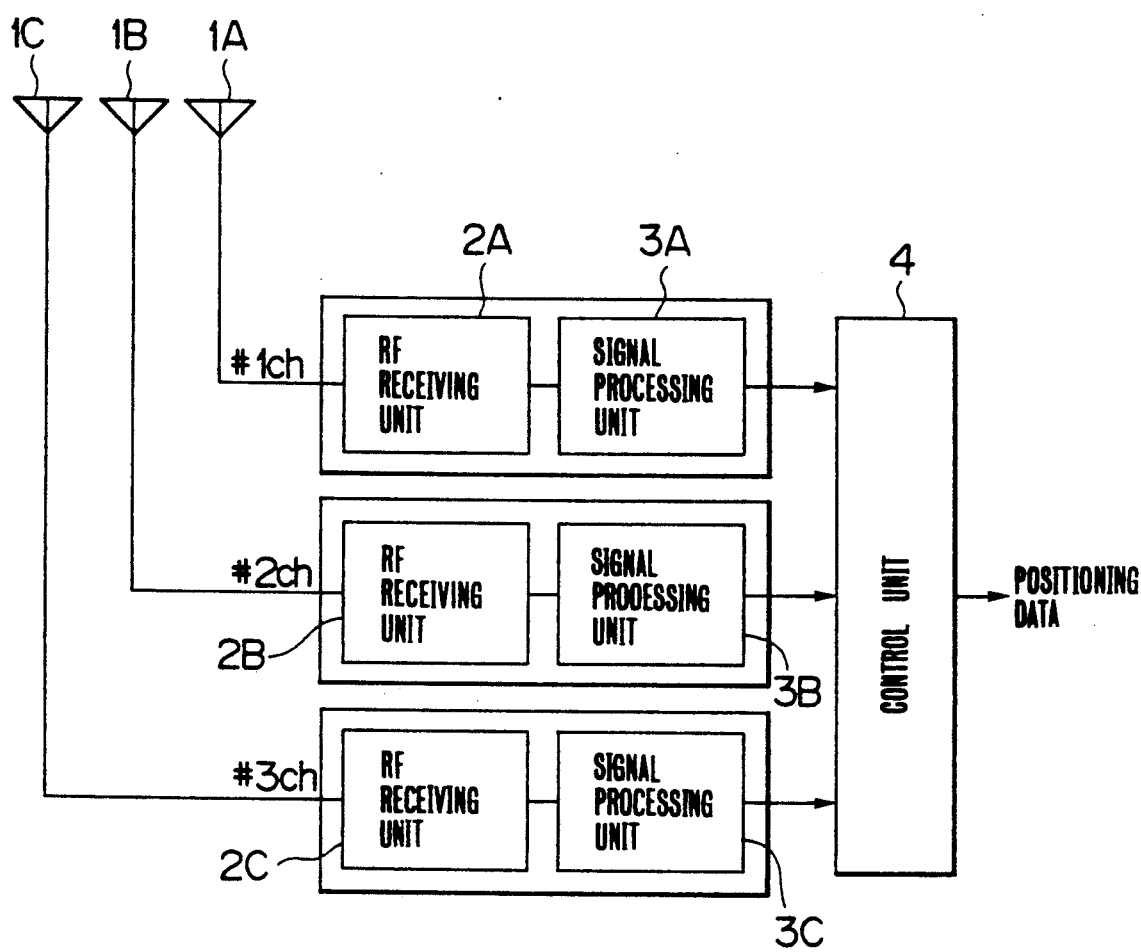
FIG. 5 is a block diagram showing another motor vehicle-mounted GPS receiver embodying the present invention.

Still another embodiment of the present invention will now be described with reference to FIGS. 5 and 6. FIG. 5 is a block diagram of a motor vehicle-mounted GPS receiver embodying the present invention. According to this preferred embodiment, a GPS receiver having three receiving channels is employed for positioning and thereby first, second and third channels are denoted respectively by #1 ch, #2 ch and #3 ch, and that their corresponding components are designated by reference numerals suffixed by A, B and C, respectively, like an antenna 1A for the antenna which belongs to the receiving channel #1 ch.

In FIG. 5, three antennas 1A, 1B and 1C are mounted independently of one another, RF receiving units 2A, 2B and 2C receive satellite signals by despreading the satellite signals from GPS satellites received through respective antennas, signal processing units 3A, 3B and 3C decode the satellite signals received by the RF receiving units 2A, 2B and 2C into original digital data, and a control unit 4 selects a predetermined number, such as four, of GPS satellites considered to be the most suitable for positioning at that point of time and calculates the current position by utilizing the navigation data contained in the satellite signals form the selected GPS satellites. The three antennas 1A, 1B and 1C should preferably be mounted at separated positions such as inside of the windshield, inside of the rear window or other appropriate positions.

Upon initiation of the reception of satellite signals, the GPS satellite transmissions received by the antenna 1A, 1B and 1C are despreaded at the RF receiving units 2A, 2B and 2C, respectively, for receiving satellite signals transmitted as many GPS satellites as possible by each of the receiving channels. The received satellite signals are then fed to the control unit 4 after decoding them into the original digital data by the signal processing units 3A, 3B and 3C.

It is assumed that the receiving channels are all in the receiving status as shown in FIG. 6(A), FIG. 6(B) and FIG. 6(C), that is, if satellite signals from the three GPS satellites S1, S3 and S4 are received by the receiving channel #1 ch, satellite signals from the three satellites S2, S3 and S7 are received by the receiving channel #2 ch, and satellite signals from the two satellites S5 and S6 are received by the receiving channel #3 ch, the signal processing units 3A, 3B and 3C decode each of the satellite signals received by the respective receiving channels and in turn the decoded signals are fed to the control unit 4.

Figure 6:
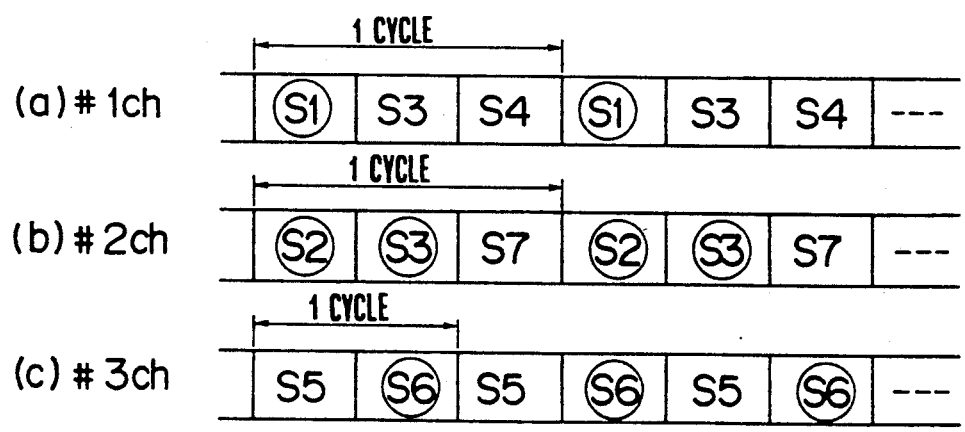
FIG. 6 is a diagram showing GPS satellites whose signals are received by respective channels of the GPS receiver of FIG. 5.

The control unit 4 selects a combination of the GPS satellites that has the minimum PDOP value, for example, the GPS satellites S1, S2, S3 and S6 identified by open circle (○) in FIG. 6, by utilizing the navigation data received from the GPS satellites S1-S7 being fed by the signal processing units 3A, 3B and 3C, and thereby the present position of the vechicel which carries the GPS receiver is computed by the control unit 4 b making use of the navigation data of these selected GPS satellites. This allows the GPS receiver to perform the positioning operation with high degree of accuracy at that point of time. In the example of FIG. 6, regarding the GPS satellite S3, satellite signals from which are received by two receiving channels #1 ch and #2 ch. In this case, it is preferable to perform the positioning by utilizing the receiving channel whichever the received signal strength is stronger.

The positioning data thus obtained is transmitted to a navigation apparatus (not shown) for displaying, as positional information, on a cathode-ray tube (CRT) or the like on which a map is displayed.

Further, If the GPS satellite S2 is obstructed by a building or other obstacles in the midst of above-described positioning operation and becomes no reception of satellite signal therefrom, the control unit 4 eliminates the obstructed satellite S2 and immediately recalculates the PDOP values using the remaining six GPS satellites in contact for selecting another combination of four GPS satellites that has the minimum PDOP value at that point of time, and then the positioning is continued by utilizing the navigation data of the newly selected four GPS satellites. Accordingly, even if several GPS satellites are obstructed by a building or the like for causing no reception of satellite signals, it is possible to perform the positioning without interruption by selecting the best combination of the GPS satellites available for high degree of accuracy of positioning from among the rest of GPS satellites in contact.

The third preferred embodiment has been described with reference to a three-channel type GPS receiver, however, the positioning method according to this invention is not to be considered to be limited thereto, the invention may also be applied for use with other type of GPS receivers having two or more receiving channels.

As it has been described above, according to the first aspect of the invention, a single antenna of the best in the number of contact with GPS satellites is selected from a plurality of antennas in order to receive satellite signals, while, according to the second and third aspects of the invention, the required minimum number of GPS satellites considered to be the best of combination in view of PDOP value for positioning are selected from among all of GPS satellites being in contact with each antenna or all antennas. This invention allows the uninterrupted positioning operation for the GPS receiver to perform by substituting the rest of GPS satellites in contact for the obstructed GPS satellite even if some satellite is obstructed by a building or other obstacles for causing no reception of satellite signals. This invention is particularly effective when implemented in a motor vehicle-mounted GPS receiver for giving high degree of accuracy of positioning regardless of the change of status of satellite signal reception.

While the invention has been described with reference to preferred embodiments, it will be understood by those skilled in the art that various changes may be made and equivalents may be substituted for elements thereof without departing from the scope of the invention.

What is claimed is:

1. A single receiving channel GPS receiver comprising:
   a plurality of antennas;
   antenna switching means for selecting any of said plurality of antennas by switching; and
   control means for controlling said antenna switching means to select an antenna having the maximum number of GPS satellites in contact therewith from among said plurality of antennas.

2. A signal receiving channel GPS receiver as defined in claim 1, wherein said plurality of antennas are two antennas mounted at the front end and the rear end of a motor vehicle.

3. A signal receiving channel GPS receiver as defined in claim 1, wherein said control means compares numbers of GPS satellites in contact with said plurality of antennas.

4. A signal receiving channel GPS receiver as defined in claim 1, further comprising RF signal receiving means for receiving navigation data sequentially from the GPS satellites by despreading received satellite signals; and processing means for reckoning a current position by making use of the navigation data.

5. A single receiving channel GPS receiver for receiving satellite signals from a plurality of GPS satellites transmitting positioning signals, comprising:
   a plurality of antennas for respectively receiving said positioning signals;
   antenna switching means for selecting any of said plurality of antennas; and
   control means for selecting a predetermined number of GPS satellites from among all of GPS satellites in contact with the plurality of antennas when each of said antennas fails to receive satellite signals from the predetermined number of GPS satellites, and for controlling said antenna switching means to select in a sequential manner, antennas that correspond to the selected GPS satellites, wherein said predetermined number of GPS satellites are selected based on one of (1) the PDOP value and (2) the order of signal strength.

6. A signal receiving channel GPS receiver as defined in claim 5, further comprising RF signal receiving means for receiving navigation data sequentially from the GPS satellites by despreading received satellite signals; and processing means for reckoning a current position by making use of the navigation data.

7. A signal receiving channel GPS receiver as defined in claim 5, wherein said number of GPS satellites is determined by selecting a combination of GPS satellites in contact having the smallest PDOP value.

8. A signal receiving channel GPS receiver as defined in claim 5, wherein said number of GPS satellites is selected in order of signal strength of the received satellite signals.

9. A signal receiving channel GPS receiver as defined in claim 5, wherein said predetermined minimum number of GPS satellites is determined independently for each of the plurality of antennas.

10. A signal receiving channel GPS receiver as defined in claim 5, wherein said predetermined minimum number of GPS statellites is determined to be the same for each of the plurality of antennas.

11. A positioning method for use with a vehicle-mounted GPS receiver having a plurality of receiving channels each of which includes an antenna, an RF receiving unit and a signal processing unit, comprising the steps of:
   receiving satellite positioning signals independently from GPS satellites in contact through each of said receiving channels;
   selecting a number of GPS satellites having the most preferred positioning signal at the current point of time from among all GPS satellites in contact with respective receiving channels, said most preferred positioning signal being determined by one of (1) the PDOP value and (2) the order of signal strength; and
   performing the positioning by making use of navigation data obtained from said selected GPS satellites.

12. A positioning method as defined in claim 11, wherein the step of selecting selects a predetermined number of GPS satellites considered to be the best in view of PDOP value for positioning.

13. A positioning method as defined in claim 12, wherein the step of selecting is performed when any of the selected GPS satellites is obstructed by an obstacle.

14. A positioning method for use with a vehicle mounted GPS receiver having a plurality of receiving channels each of which includes an antenna, comprising the steps of:

receiving satellite signals independently from a plurality of GPS satellites through each of said antennas;

determining which antenna has received signals from the greatest number of satellites; and performing positioning by making use of navigation data obtained via the antenna determined to have received signals from the greatest number of satellites.

* * * * *